United States Patent
Nishimura

(10) Patent No.: US 11,377,999 B2
(45) Date of Patent: Jul. 5, 2022

(54) THERMOSTAT DEVICE

(71) Applicant: NIPPON THERMOSTAT CO., LTD., Kiyose (JP)

(72) Inventor: Tetsuya Nishimura, Kiyose (JP)

(73) Assignee: NIPPON THERMOSTAT CO., LTD., Kiyose (JP)

( * ) Notice: Subject to any disclaimer, the term of this patent is extended or adjusted under 35 U.S.C. 154(b) by 0 days.

(21) Appl. No.: 17/439,620

(22) PCT Filed: Mar. 6, 2020

(86) PCT No.: PCT/JP2020/009659
§ 371 (c)(1),
(2) Date: Sep. 15, 2021

(87) PCT Pub. No.: WO2020/203040
PCT Pub. Date: Oct. 8, 2020

(65) Prior Publication Data
US 2022/0154627 A1    May 19, 2022

(30) Foreign Application Priority Data
Apr. 4, 2019   (JP) .............................. JP2019-071902

(51) Int. Cl.
*F01P 7/16*   (2006.01)
*F16K 27/02*   (2006.01)
(Continued)

(52) U.S. Cl.
CPC ................ *F01P 7/16* (2013.01); *F16K 27/02* (2013.01); *F16K 31/002* (2013.01); *F01P 2007/146* (2013.01)

(58) Field of Classification Search
CPC .......... F01P 7/16; F01P 2007/146; F01P 7/12; F01P 2031/32; F16K 27/02; F16K 31/002; F16K 99/0036
See application file for complete search history.

(56) References Cited

U.S. PATENT DOCUMENTS

| | | | | |
|---|---|---|---|---|
| 3,792,813 A | * | 2/1974 | Saur ........................ | F16K 27/02 236/100 |
| 5,381,952 A | * | 1/1995 | Duprez .................... | F01P 11/16 236/DIG. 2 |
| 2012/0319028 A1 | * | 12/2012 | Kusakabe ............ | G05D 23/022 251/366 |

FOREIGN PATENT DOCUMENTS

| JP | 2008-157194 A | 7/2008 |
|---|---|---|
| JP | 2011-179480 A | 9/2011 |

(Continued)

OTHER PUBLICATIONS

International Search Report dated Jun. 9, 2020, issued in counterpart International Application No. PCT/JP2020/009659. (2 pages).

*Primary Examiner* — Jacob M Amick
(74) *Attorney, Agent, or Firm* — WHDA, LLP

(57) ABSTRACT

Provided is a thermostat device capable of reducing flow resistance due to a thermal-operating unit and a frame support and also reducing the pressure loss in the flow passage. The thermostat device is provided with a control valve which opens and closes a flow passage in a housing based on expansion or contraction of a thermal expansion body in a thermo-sensitive element and a spring that biases the control valve to close and a spring receiving frame that receives one end of the spring. A thermal-operating unit is incorporated into the housing by locking the spring receiving frame to the frame supports formed in the flow passage of the housing. At the upstream side of the coolant flow at the frame support, a rectifier is disposed that prevents water streams from colliding by detouring the flow passage of the coolant heading to the frame support and the spring receiving frame.

6 Claims, 7 Drawing Sheets

(51) Int. Cl.
*F16K 31/00* (2006.01)
*F01P 7/14* (2006.01)

(56) References Cited

FOREIGN PATENT DOCUMENTS

| JP | 2018-105184 A | 7/2018 |
| JP | 2018-105185 A | 7/2018 |

* cited by examiner

THERMOSTAT DEVICE

TECHNICAL FIELD

The present invention relates to a thermostat device which is disposed in a circulation channel for circulating a coolant between an internal combustion engine (hereinafter also referred to as engine) of automobiles, for example, and a radiator and variably controls the temperature of the coolant.

BACKGROUND ART

A thermostat device is provided with a thermo-sensitive element incorporating a thermal expansion body (wax) which expands or contracts due to the temperature change of a coolant flowing through the inside of a circulation channel between an engine and a radiator. The thermostat device functions to keep the coolant at a predetermined temperature by opening or closing a control valve in response to the volume changes due to the expansion and contraction of the thermal expansion body.

That is, the thermo-sensitive element filled with a thermal expansion body and a thermal-operating unit having the control valve body is housed in a housing and disposed at the entrance, for example, of the coolant passage of the engine. The coolant circulates by way of a by-pass passage without going through the radiator when the temperature of the coolant is low and the control valve is closed.

When the temperature of the coolant rises, the valve opens to allow the coolant to circulate through the radiator. With this, the thermal-operating unit keeps the temperature of the coolant, which flows through a water jacket as a cooling passage of the engine, in a predetermined state.

Thermostat devices of this kind are conventionally modified and proposed in various ways. The present applicant has proposed a thermal-operating unit including a thermo-sensitive element and a control valve therein and a thermostat device housing a temperature sensor detecting the temperature of the coolant. This proposal is disclosed in a PTL 1.

CITATION LIST

Patent Literature

PTL1: JP-A-2011-179480

With the use of the above-described thermostat device, the temperature sensor in the housing of the thermostat device can detect the temperature of the coolant entering the engine with high precision. The utilization of the temperature information allows a contribution to further improvement of fuel consumption of the engine.

Since construction is employed in which the temperature sensor is detachably attached along the axial direction in a supporting tube formed in the housing, the operation to slightly draw the temperature sensor along the axial direction allows breaking the tight-sealing of the housing. Thus, practical effects are available such as a degassing function when the coolant is filled into the circulation passage or a function as a drain cock to discharge the coolant from the circulation passage at a time of exchange of coolant.

SUMMARY OF INVENTION

Technical Problem

In the thermostat device described above, when a thermal-operating unit including a thermo-sensitive element and a control valve is installed into the housing, some additional members are required such as coil spring biasing the control valve to be in a closed state and a spring receiving frame to receive one end of the coil spring.

Of these, in particular, the spring receiving frame and frame support formed in the housing may impede the flow of the coolant flowing in the housing because the faces of the spring receiving frame or the frame support are placed in a direction perpendicular to the coolant passage in the housing.

This may cause turbulence or stagnation of coolant and increase pressure loss in the passage. Accordingly, other problem may arise including cost rise due to the need for the enlargement in size of a water pump disposed in the coolant passage.

The present invention aims at providing a thermostat device capable of reducing flow resistance caused by the spring receiving frame and the frame support therefor formed in the housing and reducing pressure loss in the passage.

Solution to Problem

A thermostat device according to the present invention includes a thermal-operating unit accommodated in a housing, which is disposed in a circulation passage for circulation of a coolant between an internal combustion engine and a radiator, controls the temperature of the coolant supplied to the internal combustion engine; the thermal-operating unit that is provided with a thermo-sensitive element incorporating a thermal expansion body that expands or contracts corresponding to the coolant temperature change, a control valve that opens or closes the passage in the housing based on the expansion or contraction of the thermal expansion body in the thermo-sensitive element, a spring biasing so as to close the control valve, and a spring receiving frame receiving one end of the spring, wherein the thermal-operating unit is incorporated by a constitution that a locking portion formed on the spring receiving frame is locked to a frame support formed in the passage of the housing, and a rectifier is disposed at the upper stream of the coolant flow at the frame support to prevent a collision of coolant flow between the frame support and the spring receiving frame by bypassing the coolant flow forwarding the frame support and the spring receiving frame.

In this case, it is desirable to configure that the rectifier is disposed to protrude from the wall of the housing along the passage of the housing, and a central portion of the rectifier is located on an upstream side of the coolant flow and, both leg portions thereof are located at the downstream of the coolant flow compared to the central portion.

Another configuration is preferably employed that the rectifier is disposed to protrude from the wall of the housing along the inside of the passage of the housing with one end thereof located upstream of the coolant flow and the other end located downstream of the coolant flow; such a bar-shaped rectifier is continuously formed to be diagonal to the flow direction of the coolant.

A coil spring is used as a spring; the diameter of a first end thereof is gradually reduced toward a second end to form a cone shape preferably. The spring is disposed such that the larger diameter portion of the spring abuts on the control valve and the smaller diameter thereof abuts on the spring receiving frame.

In addition, the spring receiving frame has locking portions to be locked to the frame support. The locking portions are provided on both sides in the longitudinal direction of the spring receiving frame and formed to a rectangular shape. The width of the spring-receiving frame at the position on which the second end with a small diameter of the coil spring abuts is desirably formed substantially the same as the width of the locking portion of the spring receiving frame.

Advantageous Effects of Invention

In the thermostat device according to the present invention, a rectifier is disposed on an upstream side of the coolant flow at the frame support formed in the housing so that collision of coolant flow against the frame support and the spring receiving frame is avoided by detouring the flow passage of the coolant heading to the frame support and the spring receiving frame.

In a preferable embodiment of the rectifier, since a central portion of the rectifier is located on an upstream side of the coolant flow and both leg portions thereof are located at the downstream of the coolant flow compared to the central portion, the increase of flow resistance due to the frame support and the spring receiving frame supported thereby can be suppressed.

In another preferable embodiment of the rectifier, the rectifier is disposed protruding along the inside of the passage of the housing with one end thereof located upstream of the coolant flow and the other end located downstream of the coolant flow; the bar-shaped rectifier is continuously formed to be diagonal to the flow direction of the coolant.

Thus, the increase of flow resistance due to the frame support and the spring receiving frame supported thereby can be suppressed, and the flow of the coolant in the housing can be smoothed.

Further, a coil spring is used as a spring biasing to close the control valve; the diameter of one end thereof (first end) is gradually reduced toward the other end (second end) to form a cone shape. The spring receiving frame is configured to be in contact with the reduced-diameter portion of the spring. In addition, a structure is employed that the width of the spring receiving frame at the position with which the second end with a small diameter of the coil spring is in contact is desirably formed to be substantially the same as the width of the locking portion of the spring receiving frame. This contributes to allowing a further size reduction of the spring receiving frame and a further reduction of flow resistance due to the spring receiving frame in the housing.

Therefore, a thermostat device can be provided in which the coolant flow in the housing is smoothed more and the pressure loss within the circulation passage can be reduced, owing to the action of the rectifier and the employment of the spring receiving frame with a narrow width.

DESCRIPTION OF EMBODIMENTS

Figure 1:
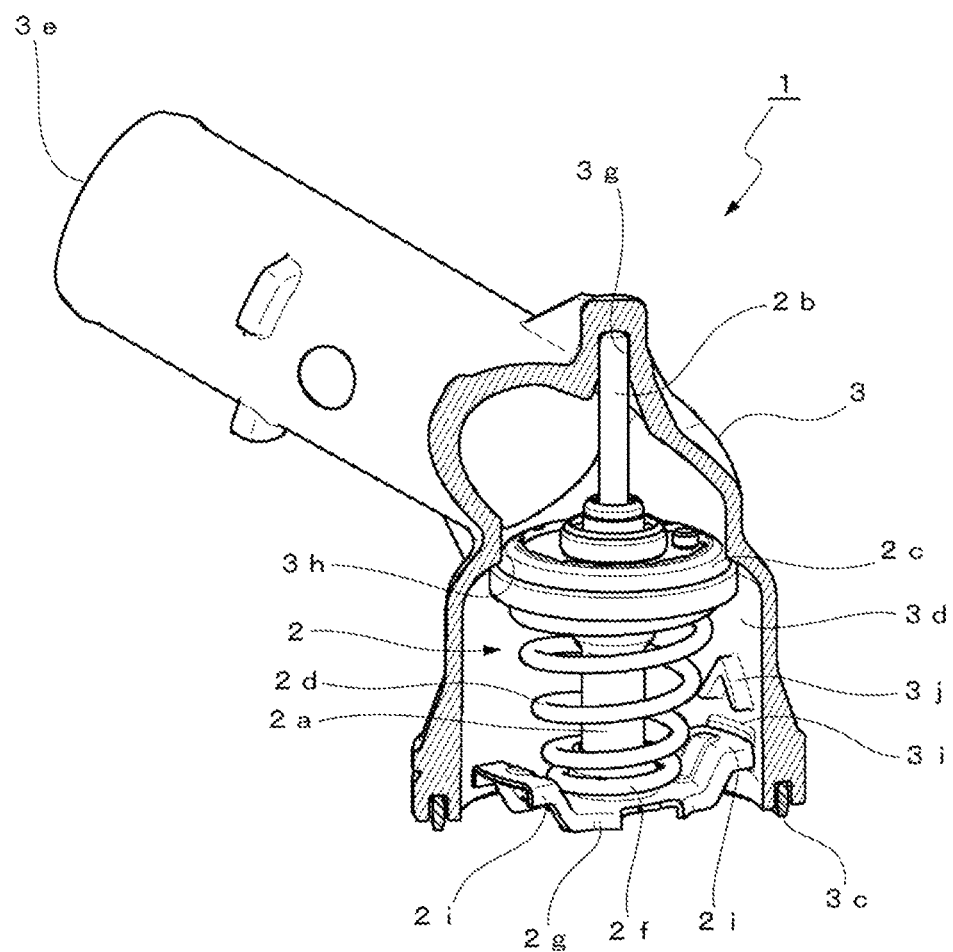
FIG. 1 illustrates a first embodiment of a thermostat device according to the present invention and is a perspective view thereof by cutting the housing away partially.
Figure 2:
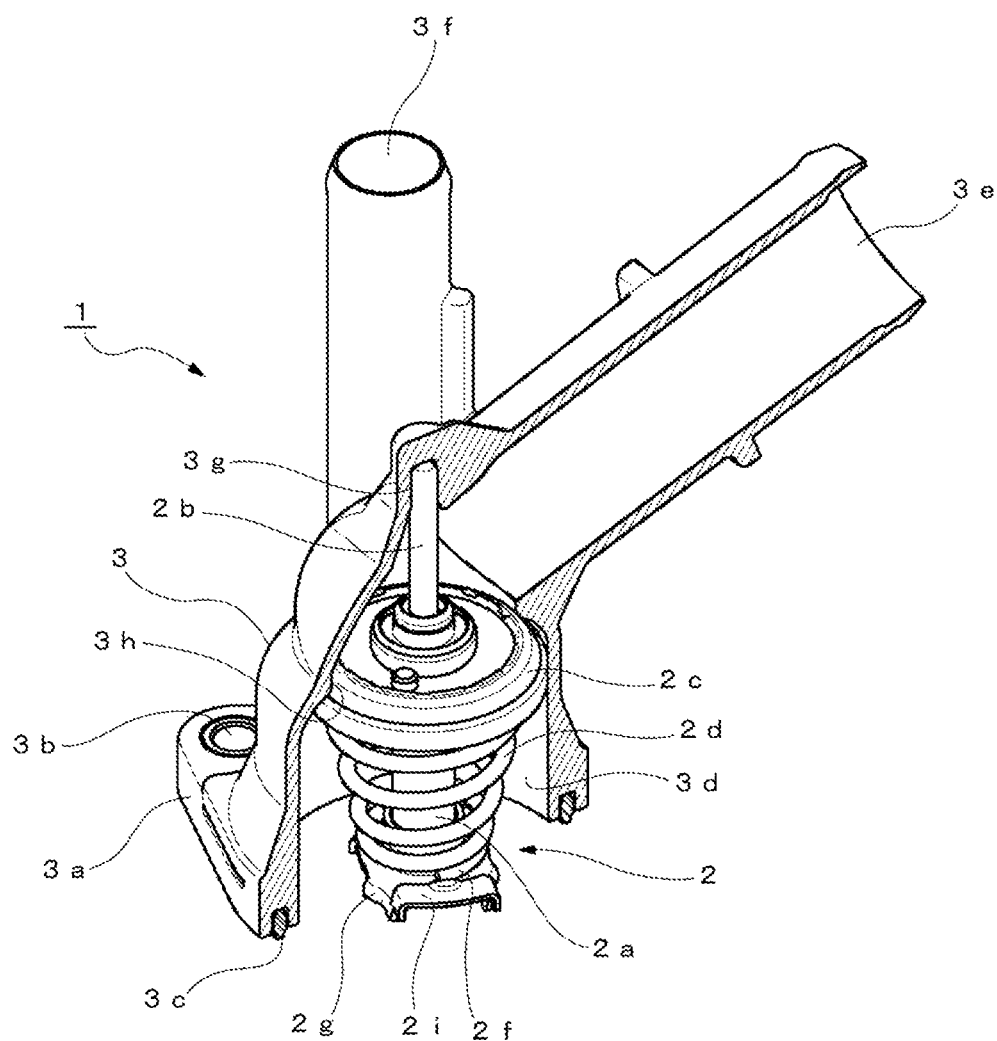
FIG. 2 is a perspective view from another viewpoint of the housing partially cut away in the first embodiment of a thermostat device.
Figure 3:
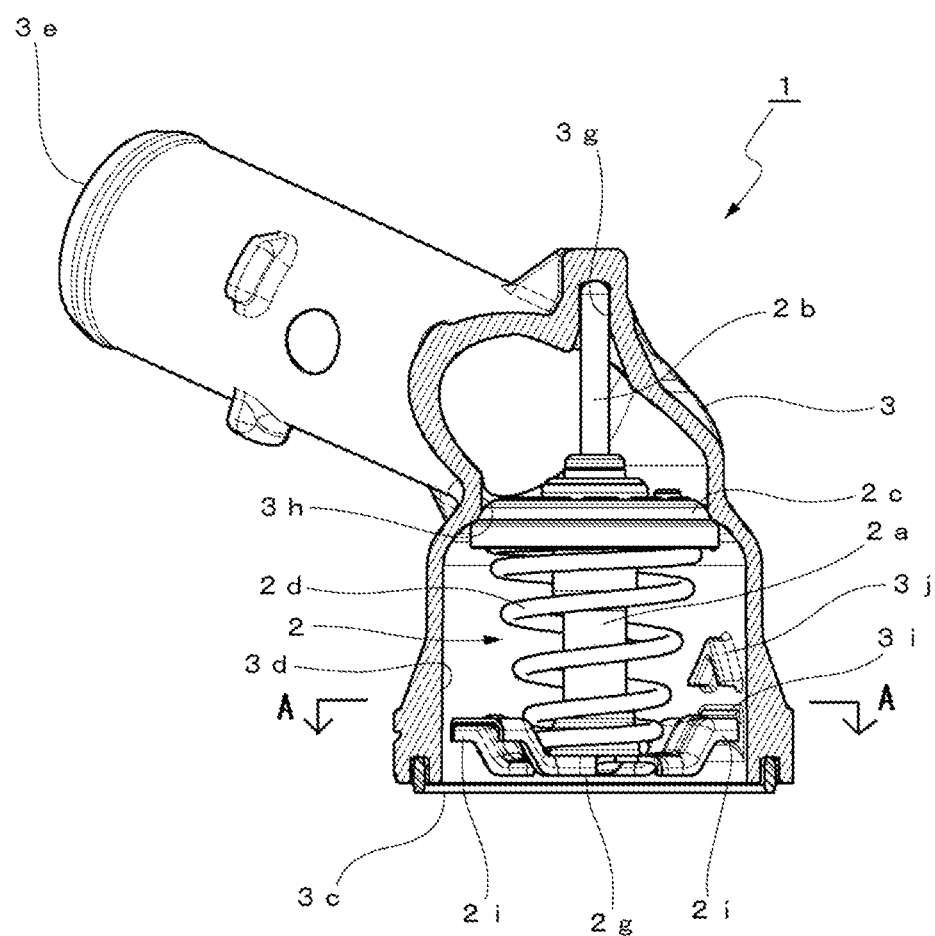
FIG. 3 is a front view of the housing partially cut away in the first embodiment of a thermostat device.

A thermostat device according to the present invention will be described based on embodiments illustrated in the drawings. FIGS. 1 through 7 show a first embodiment of the thermostat device; FIGS. 1 to 3 among those show the entire construction of a thermostat device 1.

The thermostat device 1 is disposed in a circulation passage for the circulation of coolant between an engine and a radiator, and a thermal-operating unit 2 that controls the temperature of the coolant supplied to the engine is accommodated in a housing 3.

That is, the thermostat device is disposed at an intersection of a coolant flow passage from the radiator and a bypassing path from the outlet of the engine and operates to properly control the temperature of the coolant to an inlet at the engine by switching the flow rate of the coolant from a first flow passage and a second flow passage each composed of the above flow passage and the path.

In this embodiment, the housing composing an outer frame of the thermostat device 1 is made of a synthetic resin material. By disposing the thermostat device upstream of a water pump supplying the coolant into the engine, the coolant is configured to circulate in the circulation path by driving a water pump.

For this purpose, the bottom of the housing 3 is opened and provided with a flange 3a for directly connecting the thermostat device to the water pump and bolt insertion holes 3b for fastening bolts at opposed positions by 180 degrees on the flange 3a. An annular packing 3c abutting on the water pump is attached along the periphery of the bottom of the housing 3.

A coolant flow passage 3d in the housing is formed by forming a cylindrical inner space at a central portion of the housing 3; the thermal-operating unit 2 is incorporated in the inner space.

In the housing 3, an inlet 3e for receiving the coolant from the radiator is formed and the inlet 3e is formed to a state of being bent at an angle of approximately 45 degrees to the axial line of the inner space in the housing 3 where the thermal-operating unit 2 is accommodated.

Further, in the housing 3, an inlet 3f for receiving the coolant through the bypassing path from the engine outlet is formed, and the inlet 3f is formed with facing upward (see FIG. 2) approximately parallel to the axial line of the inner space of the housing 3.

The inlet 3f of this embodiment receives part of the coolant from the engine outlet through a heater core as a heat exchanger for indoor heating; that is, the heater core also serves as a by-pass passage.

A thermo-sensitive element 2a having a cylindrical shape is provided containing a thermal expansion body (wax) expanding or contracting in response to the temperature change of the coolant in the thermal-operating unit 2 accommodated in the inner space of the housing 3. The expansion or contraction of the thermal expansion body causes a piston 2b to move as to extend or to retract along the longitudinal direction from the thermo-sensitive element.

The thermal-operating unit 2 is fixed to the housing 3 with a distal end of the piston 2b fitted into a blind hole 3g bored serving as a receiving part at an upper-central area of the housing 3.

A disc-shaped control valve (valve body) 2c is attached to the thermo-sensitive element 2a; control valve 2c is set in a closed state to touch a valve seat 3h that is formed by slightly reducing the inner diameter of the inner space of housing 3. A spring 2d is disposed with surrounding the thermo-sensitive element 2a such that a first end thereof touches the control valve and a second end of the spring 2d is received by a spring receiving frame 2g.

Figure 4:
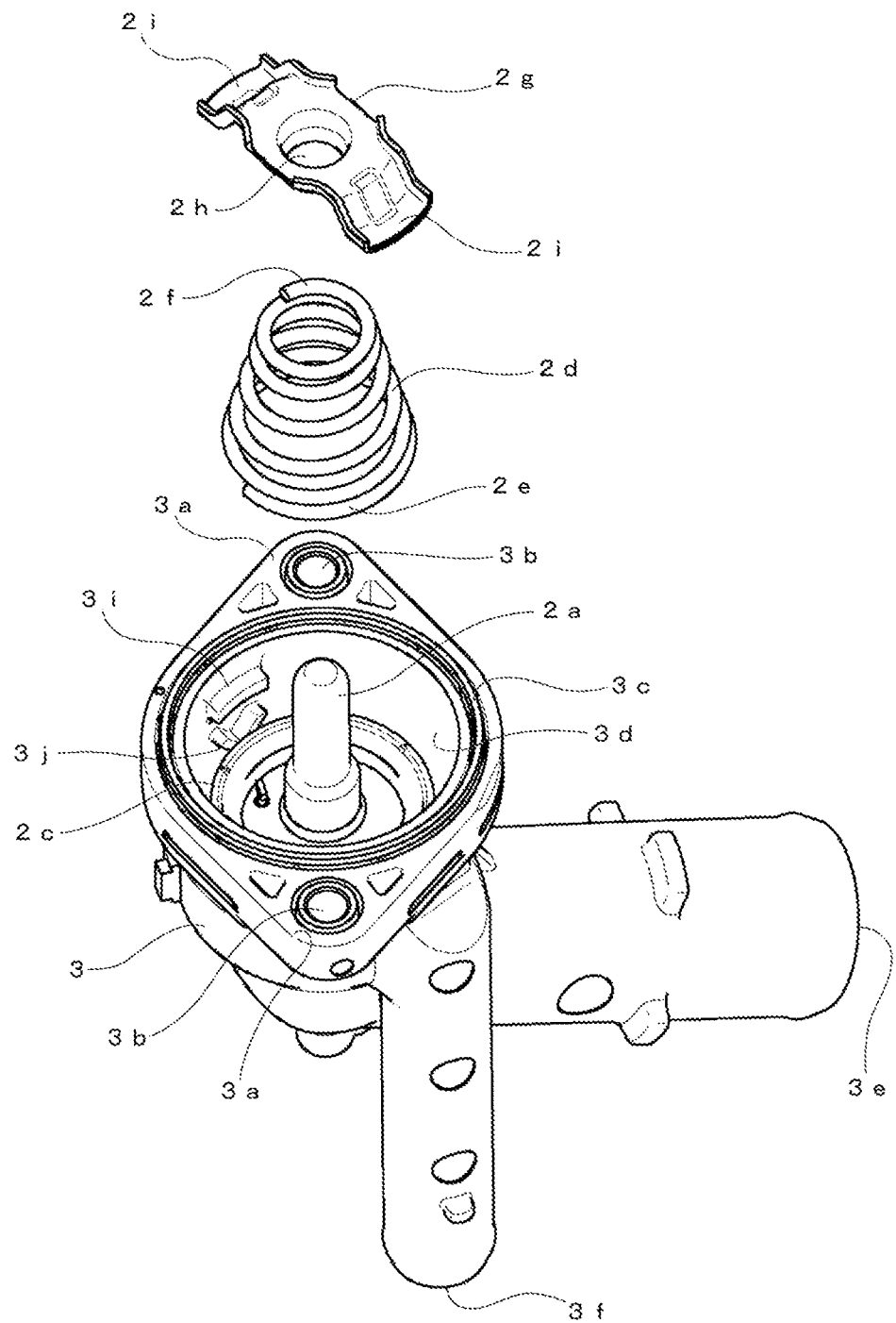
FIG. 4 is a perspective view of the partially disassembled thermostat device in an upside-down position from a state in FIG. 2.

The spring 2d is composed of a coil spring; the diameter of the first end thereof is gradually reduced toward the second end to form a tapered shape. As shown in FIG. 4, the spring 2d is disposed such that the first end (larger diameter portion 2e) of the spring is in contact with the disc-shaped control valve 2c and the second end (smaller diameter portion 2f) thereof is in contact with a central area of the spring receiving frame 2g.

The spring receiving frame 2g has an insertion hole 2h for the thermo-sensitive element 2a at the center of the spring receiving frame and rectangular-shaped locking portions 2i formed on both sides of the spring receiving frame in the longitudinal direction, as shown in FIG. 4. As shown in FIG. 1 and also in FIG. 2, the width of the spring receiving frame 2g at the position on which the second end (smaller diameter portion 2f) with a small diameter of the coil spring 2d touches is formed substantially the same as the width of the locking portion 2i of the spring receiving frame 2g.

Further, as shown in FIGS. 1, 3, and 4, a pair of frame supports 3i are formed to protrude at symmetric positions with reference to the axial line, in a perpendicular direction to the axial line in the inner space, on the sidewall (flow passage 3d) of the inner space of the housing 3. The thermal-operating unit 2 is incorporated in the housing 3 by locking each of the locking portions 2i of the spring receiving frame to the pair of frame supports, respectively.

With this structure, the control valve 2c is biased to close the valve due to the expanding action of the spring 2d.

In this embodiment, a rectifier 3j, protruding into the flow passage 3d, is integrally formed with the housing 3 at the upper stream side of coolant flow at the frame supports 3i formed in the housing 3. The rectifier 3j may be formed as a separate member from the housing 3 and disposed in a state where the rectifier protrudes in the flow passage 3d.

The rectifier 3j, with the opening of the control valve (valve body) 2c, acts to detour the coolant passage toward the passage 3d in the housing 3. This action resultantly prevents collision of the coolant flow against the frame supports 3i, the spring receiving frame 2g, and particularly the locking portions 2i formed on both ends of the spring receiving frames 2g, all of which are located just under the rectifier 3j.

For this purpose, as shown in FIG. 4 in the embodiment, the rectifier 3j is formed in a chevron shape such that the central portion of the rectifier 3j locates at the upper stream side of the coolant flow and both legs thereof locate at the lower stream side of the coolant flow than the central portion. Further, the distance between the legs of the rectifier 3j is formed approximately the same as the length of the frame support 3i.

Although the rectifier 3j is formed in a chevron shape protruding upward, one formed in an arc shape also gives a similar effect.

In addition, the construction of a rectifier 3j to be described later in a second embodiment may also be preferably employed.

With the thermostat device 1, the coolant supplied to the inlet 3f from the by-pass passage side (heater core) is supplied to the flow passage 3d of the housing 3 in which the thermo-sensitive element 2a is located. When the temperature of the coolant rises, the thermal expansion body that is contained in the thermo-sensitive element 2a expands, and the piston 2b extends accordingly. With this, the control valve 2c attached to the thermo-sensitive element 2a retracts toward the spring receiving frame 2g to open the valve against the biasing force of the spring 2d; the temperature control of the coolant is performed as publicly known.

Figure 5:
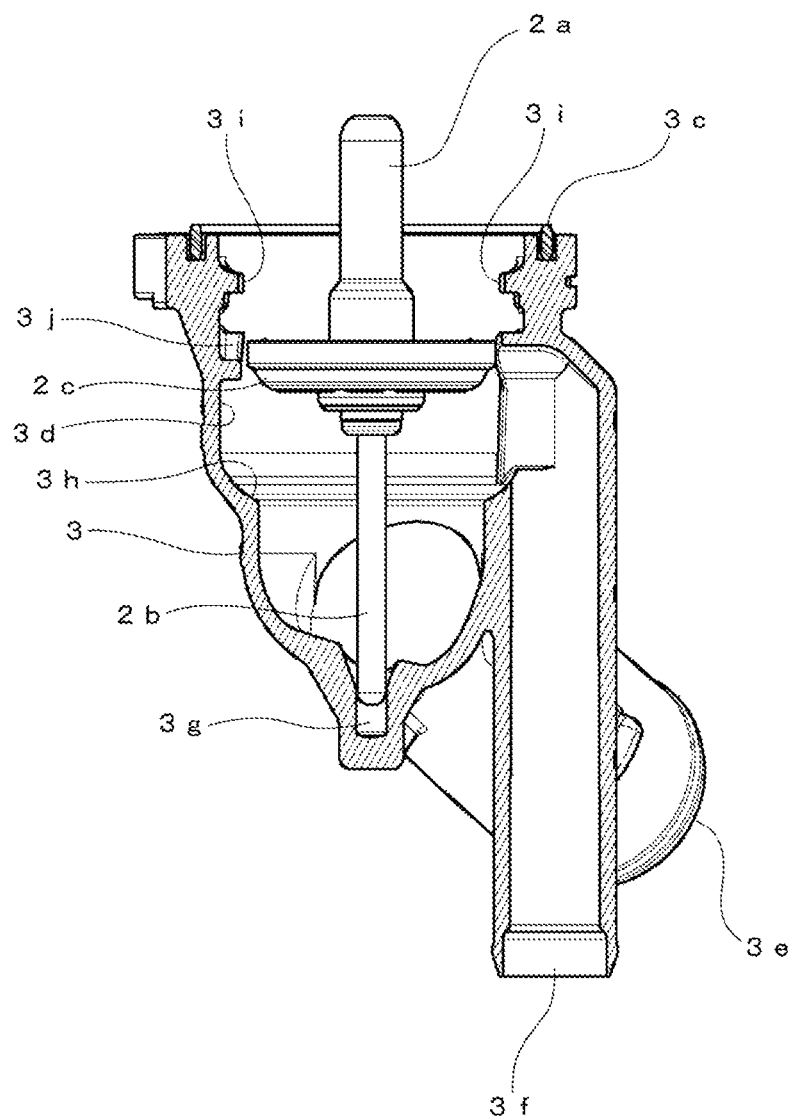
FIG. 5 is a cross-sectional view illustrating a state where part of a thermal-operating unit of the thermostat device of the first embodiment is installed in the housing.
Figure 6:
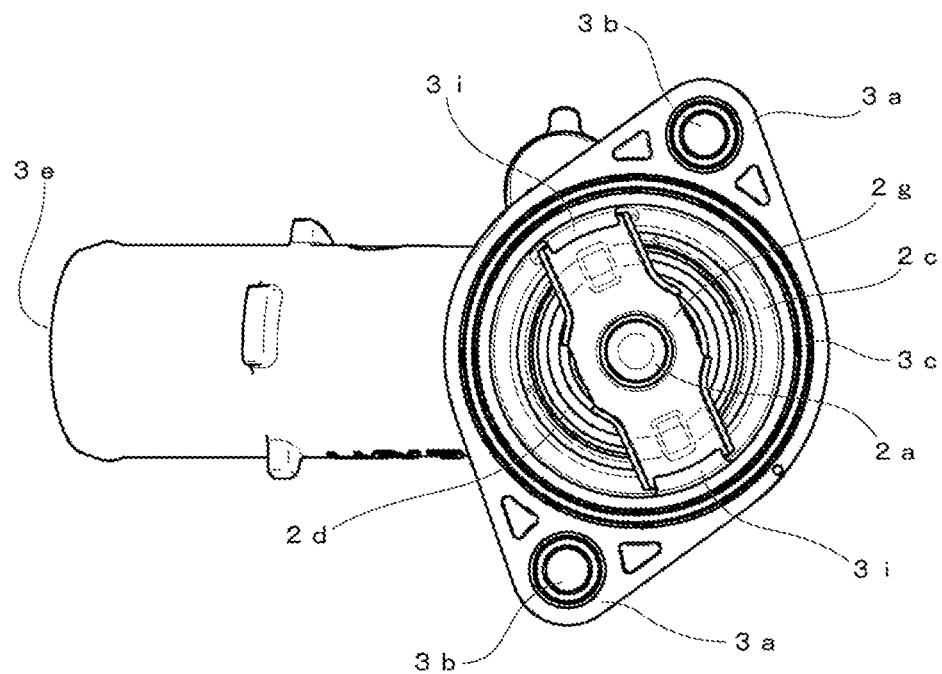
FIG. 6 is a bottom view of the thermostat of the first embodiment.
Figure 7:
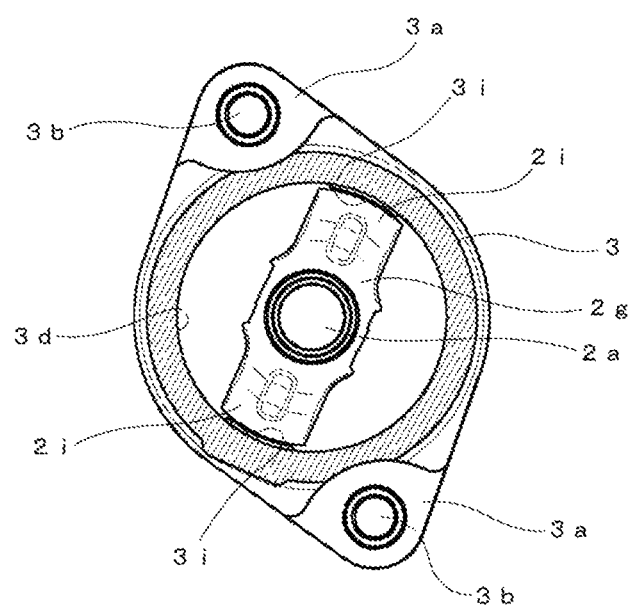
FIG. 7 is a cross-sectional view of the housing in FIG. 3 seen in the arrow direction from the A-A line.

FIG. 5 shows a state in the midst of assembling the thermostat device 1 according to the present invention, where the piston 2b of the thermo-sensitive element 2a to which the control valve (valve body) 2c is attached is being inserted into the blind hole (receiving portion) 3g.

In this embodiment, the periphery of the control valve 2c is configured to oppositely face the rectifier 3j in the housing 3 with a small gap in the state where the piston 2b of the thermo-sensitive element 2a is being inserted into the blind hole 3g.

Thus the rectifier 3j effectively functions as positioning (prevention of tilting) of the thermal-operating unit 2 including the control valve 2c; this allows smooth insertion of the piston 2b in alignment with the axial direction of the blind hole 3g of the housing 3.

In this embodiment, as shown in FIG. 5, the rectifier 3j disposed on the flow passage 3d of housing 3 is arranged to correspond to one frame support of the pair of frame supports 3i that oppose each other. This is because since an opening connected to the inlet 3f is formed inside the housing 3, the rectifier 3j cannot be disposed on the opening area. For a thermostat device without the inlet 3f from the heater core, rectifiers 3j can be respectively disposed corresponding to the pair of the frame supports that oppose each other.

Figure 8:
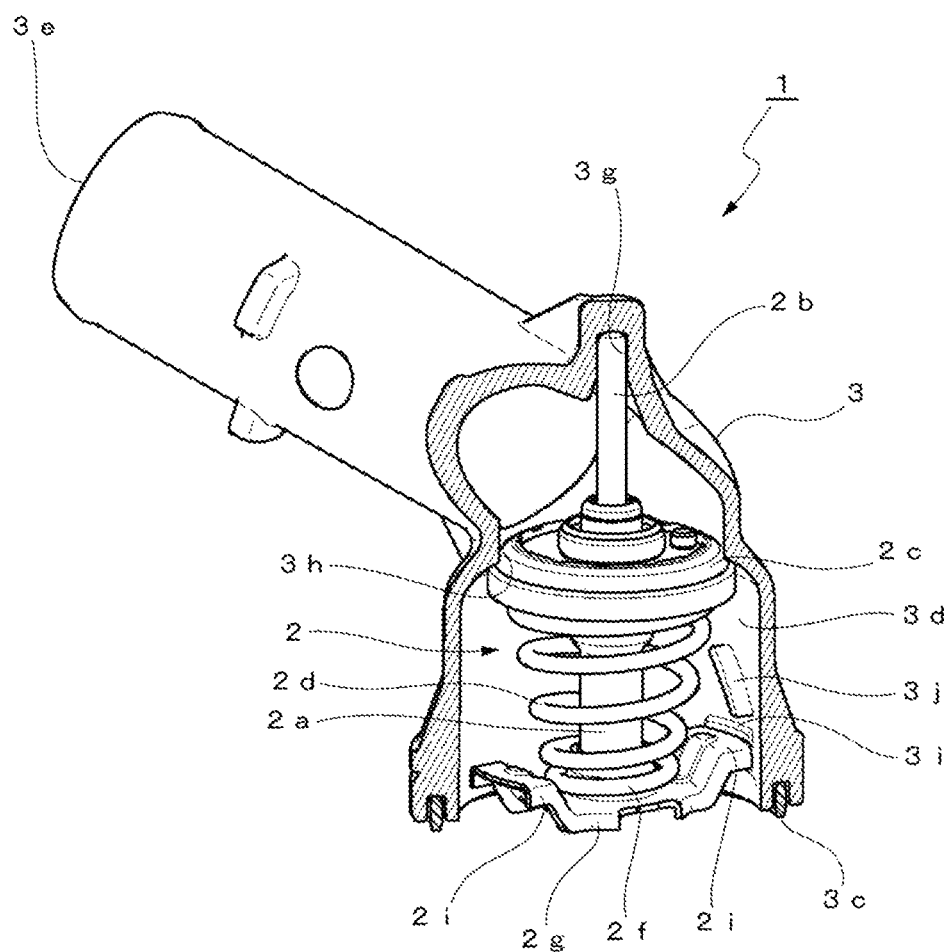
FIG. 8 is a perspective view of a second embodiment of the thermostat device according to the present invention seen from a similar viewpoint to FIG. 1.

FIG. 8 shows a second embodiment of the thermostat device according to the present invention and illustrates with a perspective view seen from a similar viewpoint to FIG. 1. Members or parts in FIG. 8 having the same functions as those in FIG. 1 are indicated with the same referential numerals; detailed descriptions for those are appropriately omitted.

Also in the thermostat device 1 shown in FIG. 8, similarly to the first embodiment shown in FIG. 1, a rectifier 3j is disposed protruding, at the upstream side of the coolant flow at the frame support 3i inside the housing 3. The rectifier 3j of the second embodiment is continuously formed to be diagonal to the flow direction of the coolant from one end thereof toward the other end such that one end is located upstream of the coolant flow and the other end located downstream of the coolant flow.

Accordingly, the rectifier 3j shown in FIG. 8, the opening of the control valve (valve body) 2c acts to cause the coolant flow from the inlet 3e of the radiator to the flow passage 3d in the housing to detour.

Namely, the rectifier 3j acts to prevent collision of the coolant flow against the frame supports 3i, the spring receiving frame 2g, and particularly the locking portions 2i formed on both ends of the spring receiving frames 2g, all of which are located just under the rectifier 3j.

Accordingly, the increase in flow resistance due to the frame support 3i and the spring receiving frame 2g supported thereby can be effectively suppressed and the coolant flow in the housing 3 can be smoothed.

With the above-described thermostat device according to the present invention, in addition to the effects described in the paragraph of Advantageous Effects of Invention, the employment of a taper-shaped spring 2d can expand the effective cross-sectional area of the coolant flow passage in the housing and consequently contribute to lower the flow resistance and pressure loss more.

Further, secondary effects such as contribution to weight-lightening of the thermostat device and reduction of costs are expected owing to the downsizing of the spring 2d and the spring receiving frame 2g.

LIST OF REFERENTIAL SIGNS 1 thermostat device
2 thermal-operating unit
2a thermo-sensitive element
2b piston
2c control valve (valve body)
2d spring
2e larger diameter portion
2f smaller diameter portion
2g spring receiving frame
2h insertion hole
2i locking portion
3 housing
3a flange
3b bolt insertion hole
3c annular packing
3d flow passage
3e inlet (radiator)
3f inlet (heater core)
3g blind hole
3h valve seat
3i frame support
3j rectifier

The invention claimed is:

1. A thermostat device, comprising:
a housing;
a thermal-operating unit, wherein the thermal-operating unit is accommodated in the thermostat and is disposed in a circulation passage that circulates a coolant between an internal combustion engine and a radiator and controls temperature of the coolant to be supplied to the internal combustion engine;
the thermal-operating unit, comprising:
a thermo-sensitive element containing a thermal expansion body therein that expands or contracts in response to the temperature change of the coolant;
a control valve opening or closing the flow passage in the housing based on the expansion or contraction of the thermal expansion body;
a spring biasing so as to close the control valve;
a spring receiving frame receiving one end of the spring;
a locking portion formed on the spring receiving frame; and
a frame support,
wherein the thermal-operating unit is incorporated by locking the spring receiving frame to the frame support formed in the flow passage of the housing,
wherein a rectifier is disposed at an upstream side of the coolant flow at the frame support to prevent a collision of coolant flow against the frame support and the spring receiving frame by causing the coolant flow forwarding to the frame support and the spring receiving frame to detour, and
wherein the rectifier is disposed projecting along the flow passage of the housing, a central portion of the rectifier is located on the upstream side of the flow of the coolant, and both legs thereof are located on the downstream side relative to the central portion.

2. A thermostat device, comprising:
a housing;
a thermal-operating unit, wherein the thermal-operating unit is accommodated in the thermostat and is disposed in a circulation passage that circulates a coolant between an internal combustion engine and a radiator and controls temperature of the coolant to be supplied to the internal combustion engine;
the thermal-operating unit, comprising:
a thermo-sensitive element containing a thermal expansion body therein that expands or contracts in response to the temperature change of the coolant;
a control valve opening or closing the flow passage in the housing based on the expansion or contraction of the thermal expansion body;
a spring biasing so as to close the control valve;
a spring receiving frame receiving one end of the spring;
a locking portion formed on the spring receiving frame; and
a frame support,
wherein the thermal-operating unit is incorporated by locking the spring receiving frame to the frame support formed in the flow passage of the housing,
wherein a rectifier is disposed at an upstream side of the coolant flow at the frame support to prevent a collision of coolant flow against the frame support and the spring receiving frame by causing the coolant flow forwarding to the frame support and the spring receiving frame to detour, and
wherein the rectifier is disposed protruding along the flow passage of the housing with one end thereof located upstream of the coolant flow and another end located downstream of the coolant flow; the rectifier is continuously formed to be diagonal to the flow direction of the coolant.

3. The thermostat device according to claim 1, wherein the spring is a tapered-shaped coil spring, a first end of the spring having a larger diameter is in contact with the control valve, and a second end of the spring having a smaller diameter is in contact with the spring receiving frame.

4. The thermostat device according to claim 3, wherein locking portions to be locked to the frame support are provided on both sides in the longitudinal direction of the spring receiving frame and formed to a rectangular shape, and the width of the spring-receiving frame at the position to which the smaller diameter end of the coil spring is in contact is formed to be substantially the same as the width of the locking portion of the spring receiving frame.

5. The thermostat device according to claim 2, wherein the spring is a tapered-shaped coil spring, a first end of the spring having a larger diameter is in contact with the control valve, and a second end of the spring having a smaller diameter is in contact with the spring receiving frame.

6. The thermostat device according to claim 5, wherein locking portions to be locked to the frame support are provided on both sides in the longitudinal direction of the spring receiving frame and formed to a rectangular shape, and the width of the spring-receiving frame at the position to which the smaller diameter end of the coil spring is in contact is formed to be substantially the same as the width of the locking portion of the spring receiving frame.

* * * * *